(12) United States Patent
Dias

(10) Patent No.: US 10,749,980 B1
(45) Date of Patent: Aug. 18, 2020

(54) AUTONOMOUS STORAGE DEVICE AND METHODS FOR DISTRIBUTING CONTENT

(71) Applicant: EMC IP Holding Company LLC, Hopkinton, MA (US)

(72) Inventor: Jonas F. Dias, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 381 days.

(21) Appl. No.: 15/386,158

(22) Filed: Dec. 21, 2016

(51) Int. Cl.
*G06F 15/16* (2006.01)
*H04L 29/08* (2006.01)
*H04L 29/06* (2006.01)

(52) U.S. Cl.
CPC ...... *H04L 67/2847* (2013.01); *H04L 65/4084* (2013.01); *H04L 67/1076* (2013.01); *H04L 67/2852* (2013.01)

(58) Field of Classification Search
None
See application file for complete search history.

(56) References Cited

U.S. PATENT DOCUMENTS

| | | | | |
|---|---|---|---|---|
| 5,896,557 A * | 4/1999 | Suzuki | ...................... | H04N 5/64 348/E5.128 |
| 2008/0133706 A1 * | 6/2008 | Chavez | ................. | H04L 67/104 709/218 |
| 2008/0175169 A1 * | 7/2008 | Deb | ........................ | H04L 45/46 370/255 |
| 2009/0300673 A1 * | 12/2009 | Bachet | ............... | H04N 7/17318 725/31 |
| 2015/0189373 A1 * | 7/2015 | Amidei | .............. | H04N 21/4384 725/120 |
| 2017/0364377 A1 * | 12/2017 | Koller Jemio | ............ | G06F 8/54 |

* cited by examiner

*Primary Examiner* — Padma Mundur
(74) *Attorney, Agent, or Firm* — Ryan, Mason & Lewis, LLP

(57) ABSTRACT

Autonomous storage devices and methods are provided for distributing content, such as streaming content. An exemplary storage device comprises: a network interface for receiving requested content over a network; a non-volatile memory (NVM) for storing the content; and a single-board computer connected to the NVM and having an operating system with an installed peer-to-peer file sharing client and an installed data curation component. The data curation component stores and manages data in the NVM. An optional lightweight unikernel comprises a specialized machine image of the operating system to support the installed peer-to-peer file sharing client and the installed data curation component. A plurality of the storage devices can be interconnected in a local network of a content service provider and/or an Internet service provider and communicate with a peer-to-peer network composed of additional storage devices in an external wide area network that consume or replicate content.

21 Claims, 7 Drawing Sheets

Data Curation Component 300

| MFID - 310 | Last Watched - 320 | Deadline - 330 |
|---|---|---|
| 3f28axc2f3fgvd9 | 2016/11/09 12:30:45 | - |
| 9ks7sc51md7sa2 | 2016/12/01 11:25:32 | 2016/12/03 00:00:00 |
| ... | ... | ... |
| 7h52m0xgs726j6 | 2016/11/30 08:13:22 | - |

Disk Storage Representation 350

M₁ M₂ M₄ M₅ M₆ M₇ M₈ M₉    95% Full

New Content 370

*Content Sorted by Last Watched Date*

FIG. 3

AUTONOMOUS STORAGE DEVICE AND METHODS FOR DISTRIBUTING CONTENT

FIELD

The field relates generally to distribution of content items, such as streamed video content.

BACKGROUND

Video content streaming services, such as Netflix™ and HBO Go™ streaming services, allow a user to decide what specific content items to watch and when. While this model has many advantages for the user, the content service provider (CSP) must support large outgoing network traffic. Although the network bandwidth has increased considerably in recent years, the demand for high quality content (e.g., 4K resolution and 60 frames per second) has also increased. The number of users per streaming service is also growing and new services tend to appear.

Internet service providers (ISPs) must also deal with the massive amount of streaming traffic. It is common for ISPs to perform traffic shaping on their infrastructure to delay video streaming in order to preserve bandwidth. The content service providers need to negotiate with ISPs to inhibit traffic shaping in order to maintain a quality experience for the user.

A need therefore exists for improved techniques and devices for the delivery of high quality video content, such as streaming content.

SUMMARY

Illustrative embodiments of the present invention provide autonomous storage devices and methods for distributing content, such as streaming content. In one exemplary embodiment, a storage device comprises: a network interface for receiving requested content over a network; a non-volatile memory for storing the content; and a single-board computer connected to the non-volatile memory and having an operating system with an installed peer-to-peer file sharing client and an installed data curation component, wherein the peer-to-peer file sharing client is configured to receive and read the requested content selectively obtained from one or more of at least one peer of a streaming service provider, at least one peer of an Internet service provider and at least one peer of a client device over the network interface, and wherein the data curation component is configured to store and manage data in the non-volatile memory.

In one or more embodiments, the exemplary storage device further comprises a lightweight unikernel comprising a specialized machine image of the operating system to support the installed peer-to-peer file sharing client and the installed data curation component. The lightweight unikernel optionally has a substantially minimal set of libraries and functionalities of the operating system necessary to support the installed peer-to-peer file sharing client and the installed data curation component.

In at least one embodiment, a content distribution system of a content service provider comprises: a plurality of storage devices connected in a local network, wherein each of the plurality of storage devices comprise a single-board computer connected to a corresponding non-volatile memory, wherein each of the single-board computers have an operating system with an installed peer-to-peer file sharing client and an installed data curation component, wherein the peer-to-peer file sharing clients are configured to receive and read requested content selectively obtained from one or more of at least one peer of a content service provider, at least one peer of an Internet service provider and at least one peer of a client device over a network interface, and wherein the data curation components are configured to store and manage data in the non-volatile memory; and a gateway server for storing a local hash table identifying file fragments stored by each of the storage devices in the local network and a counter indicating a number of times each content item is replicated in the local network, and for updating a global hash table identifying file fragments stored in a peer-to-peer network including the local network, wherein the data curation component of each of the plurality of the storage devices in the local network queries the counter to search for content items to download based on one or more of an availability of the content items in the local network and a historical request frequency of the content items.

In one exemplary embodiment, a content cache of an Internet service provider comprises: a plurality of storage devices connected in a local network, wherein each of the plurality of storage devices comprise a single-board computer connected to a corresponding non-volatile memory, wherein each of the single-board computers have an operating system with an installed peer-to-peer file sharing client and an installed data curation component, wherein the peer-to-peer file sharing clients are configured to receive and read requested content selectively obtained from one or more of at least one peer of a content service provider, at least one peer of an Internet service provider and at least one peer of a client device over a network interface, and wherein the data curation components are configured to store and manage data in the non-volatile memory; and at least one memory for storing network statistics indicating, for a given content item, a number of users that requested a download of the given content item in a predefined time window.

Advantageously, illustrative embodiments of the invention provide improved devices and techniques for distributing content. These and other features and advantages of the present invention will become more readily apparent from the accompanying drawings and the following detailed description.

BRIEF DESCRIPTION OF THE DRAWINGS

FIG. 3 illustrates the data curation component of FIG. 1, according to one embodiment of the invention;

DETAILED DESCRIPTION

Figure 1:
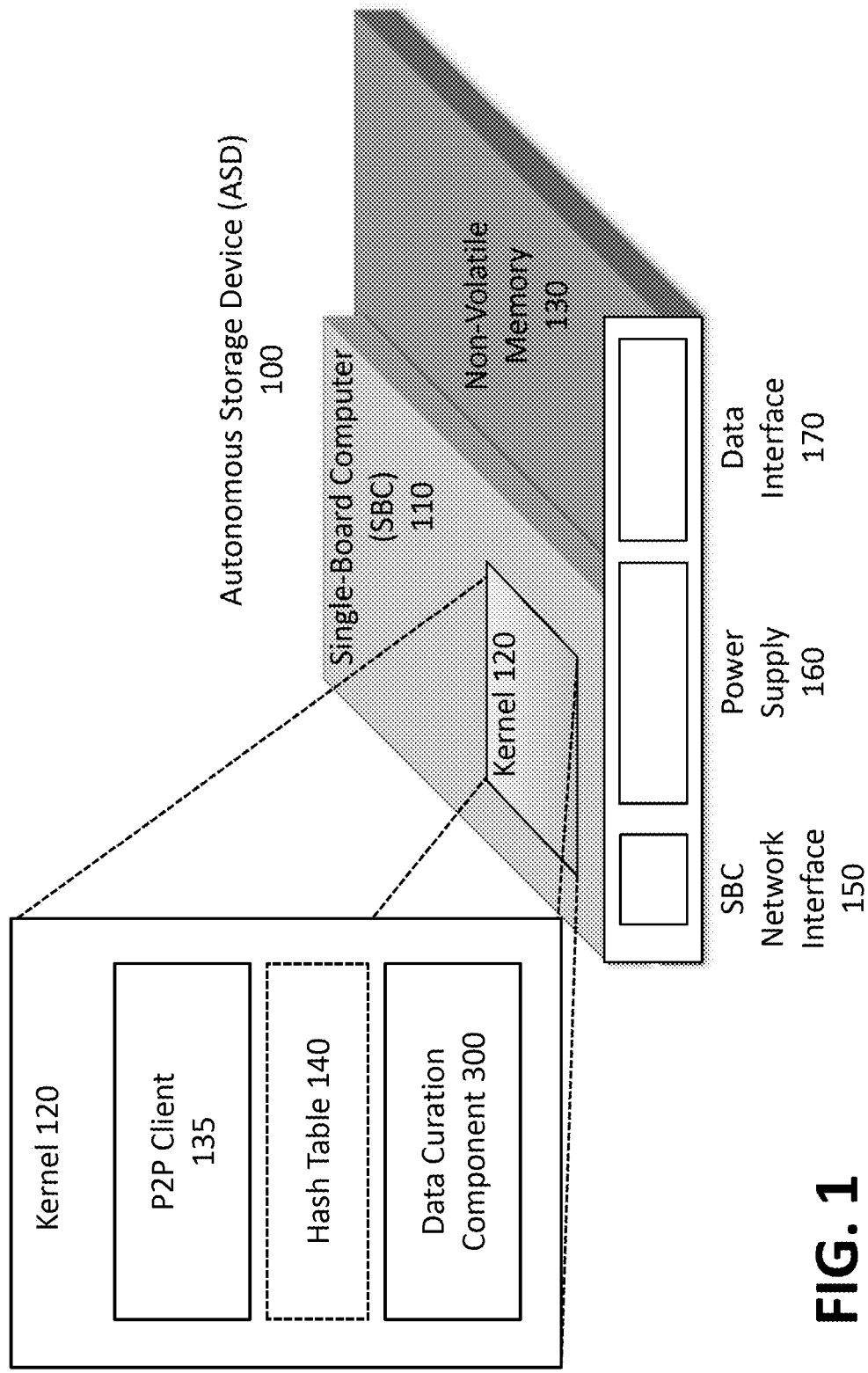
FIG. 1 illustrates a block diagram of an autonomous storage device (ASD), according to one embodiment of the invention.

Illustrative embodiments of the present invention will be described herein with reference to exemplary communication, storage and processing devices. It is to be appreciated, however, that the invention is not restricted to use with the particular illustrative configurations shown. Aspects of the invention provide autonomous storage devices and methods for distributing content. While the exemplary embodiments are described herein using streaming content, aspects of the present invention can be applied to other content distribution mechanisms, as would be apparent to a person of ordinary skill in the art based on the present disclosure.

In one or more embodiments of the invention, an autonomous storage device (ASD) and associated methods are provided for large-scale content distribution services. In at least one embodiment, the exemplary autonomous storage device comprises a non-volatile memory (e.g., a hard drive disk or a solid state drive) and a single-board computer (SBC). A kernel, such as a unikernel, executes on top of the SBC with a peer-to-peer (P2P) client, such as a BitTorrent client, that stores and indexes data in the non-volatile memory. In an implementation where a physical storage device is not used, the kernel can also run on a virtualized infrastructure, such as a Docker container. Following the principles of the exemplary BitTorrent protocol, the content service provider (CSP) will be the main server of the content, but any device in the network that contains one or more fragments of the data is a candidate peer to serve that content. All data between the content service provider and the client can remain encrypted according to the content service provider security requirements. It is the role of the application in both the server and the client to encrypt and decrypt data, respectively.

In various embodiments, the disclosed autonomous storage device can be implemented at the client, such as in a set-top box or in a smart television; at a content service provider, such as in one or more servers of the content service provider; or at an Internet service provider (ISP), such as in one or more ISP servers. An ISP, for example, can have one or more storage arrays of the disclosed autonomous storage device in order to cache "hot content" that users are demanding from the content service provider. In addition, smart televisions and set-top boxes can also be part of a P2P network to balance network traffic. Since P2P protocols are designed to support churn, the devices can be added and removed from network without major concerns. By using the disclosed autonomous storage devices, an ISP can balance their network traffic more efficiently, minimizing client-server streaming overloads.

One or more aspects of the invention recognize that large quantities of clients demanding content from the content service provider usually overload network traffic. The content service provider needs an improved infrastructure to support all of the network connections established with customers. Furthermore, there is a bandwidth waste when the same content is streamed for two or more different clients in the same region. Although network devices may have cache capabilities, they naturally become a point-of-failure in the network.

Further, routers are responsible to route the content package from the content service provider to many users demanding the streaming content. Content service providers can become overloaded if the demand is too large. Usually, the same content is delivered to multiple users. Thus, routers would benefit from a cache system. However, increasing the complexity of the software and architecture of routers would make the routers more expensive. If there is an efficient and autonomous cache near or inside the router, the router would benefit from the data locality without the responsibility of managing the data inside the cache.

Another aspect of the invention recognizes that when the ISP is overloaded with streaming traffic, the ISP may opt to activate traffic shaping policies. The traffic shaping limits the amount of bandwidth dedicated to the streaming service and tends to cause interruption and glitches on the video stream. These annoyances affect the user perception regarding the quality of service delivered by the content service provider (although the content service provider cannot control ISP policies) and may raise complaints and client churn.

Autonomous Storage Device

As noted above, one or more embodiments of the invention provide an autonomous storage device designed to support streaming services. FIG. 1 illustrates a block diagram of an autonomous storage device (ASD) 100, according to one embodiment of the invention. As shown in FIG. 1, the exemplary autonomous storage device 100 comprises a single-board computer (SBC) 110 connected to a non-volatile memory 130, such as a solid-state disk or a magnetic hard disk. The single-board computer 110 may be implemented, for example, as a Raspberry Pi™ computer, available from the Raspberry Pi Foundation.

The SBC 110 comprises a kernel 120, such as a lightweight unikernel. The kernel 120 further comprises a P2P file sharing client 135, such as a BitTorrent™ client, and a data curation component 300, discussed further below in conjunction with FIG. 3, that stores and manages data in the non-volatile memory 130. The P2P file sharing client 135 and data curation component 300 optionally share access to a hash table 140, discussed further below.

The SBC 110 is connected to a network by means of an SBC network interface 150 and comprises a power supply 160. The exemplary autonomous storage device 100 has an external read-only data interface 170, such as a Serial ATA (SATA, abbreviated from Serial Advanced Technology Attachment) computer bus interface that connects host bus adapters to mass storage devices such as hard disk drives, optical drives, and solid-state drives. In other words, content is written to the non-volatile memory 130 by the SBC 110, which obtains data packets from the network via the network interface 150, to be then accessed through the data interface 170 by an external application, such as a smart television or a set-top box application.

The P2P client 135 is responsible to receive and read content description files from the network interface 150. The choice of which torrent will be selected for download is based on the policy configured for the autonomous storage device 100. In one or more embodiments, three exemplary alternative policies are available for (1) a client-side implementation; (2) a CSP server implementation; and (3) an ISP cache implementation, each discussed further below.

In at least one embodiment, if a client-side SBC 110 decides to start the download of the media content, the SBC 110 will discover peers that have fragments of that content. The exemplary SBC 110 negotiates with other peers to transfer fragments of the content, storing them in the non-volatile memory 130. When the SBC 110 finishes the download of a given content item, the SBC 110 can decide to serve the content to other peers, keeping the data for a certain amount of time according to the configured policy, as discussed below.

The SBC 110 indexes the contents it downloads from the network. When the non-volatile memory 130 becomes full, the SBC 110 will decide what can be discarded to give space to new content 370, as discussed further below in conjunction with FIG. 3. These decisions, including the disk operations to realize them, are performed by the data curation component 300, which acts according to the configured policy. Since the behavior of the disclosed device varies according to the aforementioned policies, in the following sections, the three exemplary policies designed for the autonomous storage device 100 are described.

As noted above, in one or more embodiments, the exemplary autonomous storage device 100 is designed to support three main players: an end-user client; the content service provider, and the ISP. Thus, one policy is provided for each potential player.

Data Model

The P2P client 135 and the data curation component 300 of the exemplary autonomous storage device 100 work with the same data model. In one or more embodiments, all devices of the network have a unique identification number (UID). In one possible realization of the present invention, the UID is a hash of the media access control (MAC) address of the network interface of the device. Alternatively, other identification numbers can be generated in the network. In addition, in one or more embodiments, all media files are split into several fragments and each fragment has a unique identification number (FID). In one possible realization of the present invention, the FID is computed using a hash function over the binary content of the file fragment. The complete media file also has a unique identification number (MFID) that identifies the complete content item in the network. In one possible realization of the present invention, the MFID is computed using a hash tree over all the fragments of the content.

Since one autonomous storage device 100 can have multiple file fragments and one file fragment can be stored in multiple autonomous storage devices 100, it is important to keep track of which devices store which fragments. In one possible implementation of the present invention, this information is stored in a hash table (T), such as the hash table 140 of FIG. 1, discussed further below in conjunction with FIGS. 4 and 5, that stores the pairs (UID, FID) for all the ASD devices 100 and content fragments of the network. Since this hash table tends to be very large, the hash table can be partitioned to be stored separately on distributed servers. In one or more embodiments, the table partitions are done according to both user locality and content requests. To prevent data loss, the partitions are also optionally replicated on separate servers. In another possible implementation, the hash table that stores the (UID, FID) pairs is a distributed hash table (DHT), which is stored in the autonomous storage device 100 themselves.

In one or more embodiments, the hash table 140 can be accessed by three main interface methods: put(uid, fid), get(fid) and remove(uid, fid). The put method is used to inform that a given device 100 with a given uid has a file fragment with a given fid. The get method is used to obtain the uid of one or more devices 100 that contain the specified fid. Finally, the remove method is used to inform that a given device 100 with a given uid no longer has the fragment identified by that fid. It is noted that the interface is not restricted to these three exemplary methods. In a further variation, methods are optionally provided to register sets of fragments for a given user as well as remove sets of fragments from a given user.

The hash table 140 can optionally also store other relationships in the network such as (UID, MFID) and (MFID, FID). Depending on the implementation, these relationships can be useful for the P2P clients 135 to discover the fragments they need to download for a given media content item. Furthermore, the P2P clients 135 can discover which devices have completed the download of a given content item.

Policy 1: Support on Client-Side and Set-Top Boxes

In one or more embodiments, if the disclosed autonomous storage device 100 is implemented on client-side equipment, such as smart televisions or set-top boxes, the autonomous storage device 100 is configured to use the client policy. The client policy assumes that any incoming content description file is a user request to watch a given content. Thus, the download of the desired content should start immediately to support the video streaming. The P2P client 135 inside the autonomous storage device 100 sets the new content with the highest priority and tries to obtain the initial parts of the file, in order to avoid the delay of video playback.

When a user requests to watch a given media content, the autonomous storage device 100 receives the content description file, which can be a torrent file. The content description file should contain the MFID of the media or a list of FID of all the fragments of the file (or both). With this information, the client autonomous storage device 100 can query the hash table 140 to discover the UID of the devices 100 that contains the required fragments. With the (UID, FID) mappings provided by the hash table 140, the devices 100 can contact the other peers in the network and negotiate downloads of the fragments.

Figure 2:
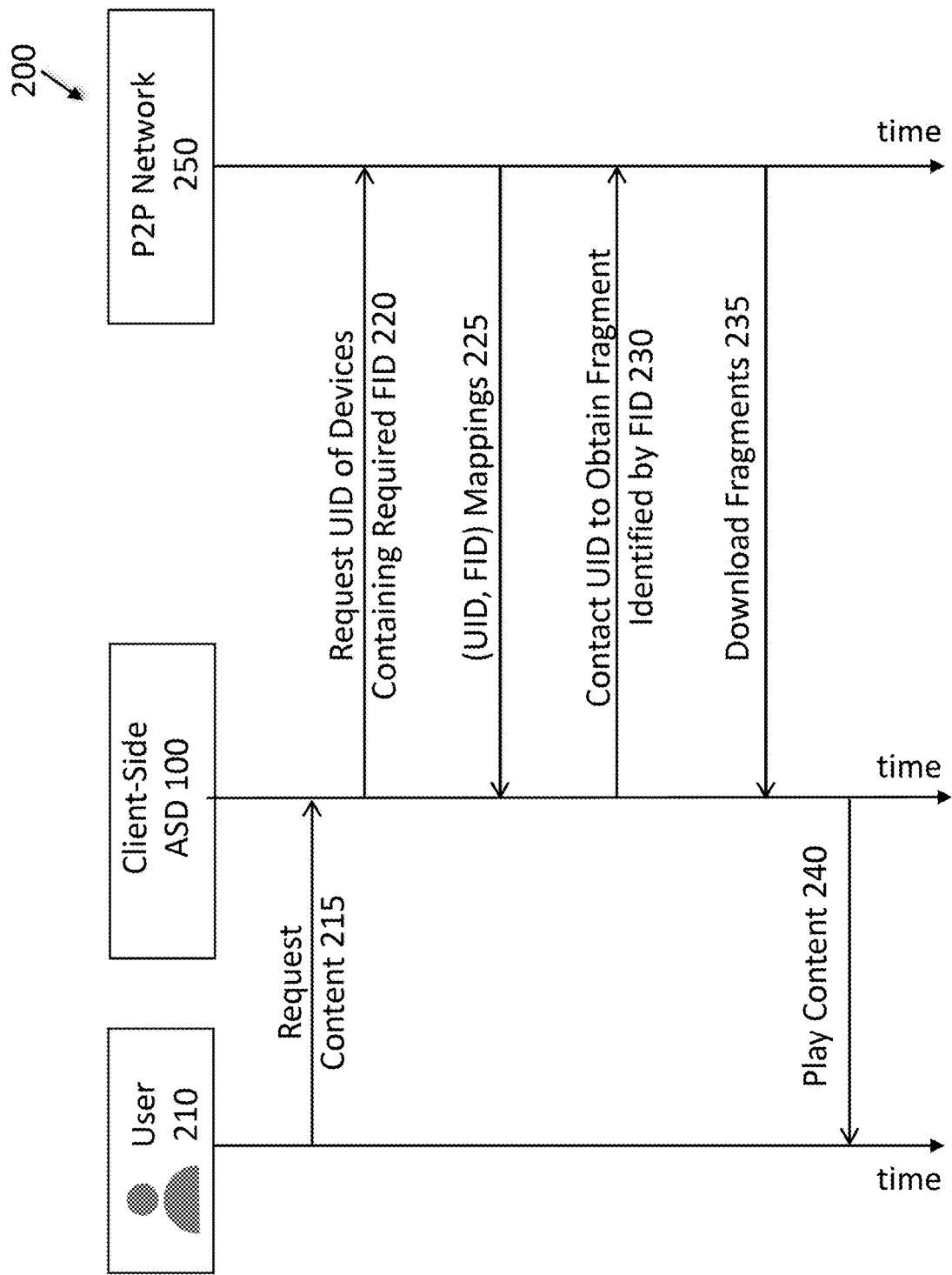
FIG. 2 illustrates an exemplary downloading process for downloading content from a peer-to-peer network, according to one embodiment of the invention.

FIG. 2 illustrates an exemplary downloading process 200 for downloading content from a P2P network 250, according to one embodiment of the invention. Generally, the exemplary downloading process 200 is similar to a traditional P2P file transfer system. As shown in FIG. 2, a user 210 requests content from a client-side autonomous storage device 100 during step 215. The client-side autonomous storage device 100 then requests the UID of devices 100 containing one or more of the required FIDs during step 220 from the P2P network 250. The P2P network 250 provides the (UID, FID) mappings from the hash table 140 to the client-side autonomous storage device 100 during step 225.

The client-side autonomous storage device 100 then contacts one or more UIDs over the P2P network 250 to obtain the desired fragments identified by the FID during step 230 and downloads the fragments during step 235 to the client-side autonomous storage device 100. The user 210 then plays the downloaded content during step 240.

Generally, as long as the client-side autonomous storage device 100 finishes the download of some fragments of the content, the client-side autonomous storage device 100 will register in the hash table 140 that it has such fragments using the put method. Then, the client-side autonomous storage device 100 will be able to serve the fragments to other devices in the network.

When the download finishes in step 235, the data curation component 300 will decide how long the client-side autonomous storage device 100 can fully serve the downloaded content to other network devices 100. In one or more embodiments, if the non-volatile memory 130 is close to being full, the data curation component 300 will remove the content that has the oldest latest watched date. In other words, content items that were watched a long time ago and were not watched again recently are natural candidates to be removed to give space for newer content. In a further variation, a retention policy based on a content rating system can be employed.

FIG. 3 illustrates the data curation component 300, according to one embodiment of the invention. In the example of FIG. 3, the data curation component 300 monitors disk usage in the non-volatile memory 130 and how much each media file NI uses of the disk space. In one possible implementation of the present invention, the disk usage is represented in a sorted list 350. The elements of the list 350 represent the downloaded media files and comprise a last watched date and the media file size. The list is sorted by the last watched date. As noted above, when the non-volatile memory 130 becomes full, the data curation component 300 will decide what can be discarded to give space to new content 370. Thus, when the new content 370 is requested, the data curation component 300 can browse the list 350 to find how many files need to be removed to give space to the new content 370. In the illustration of FIG. 3, the data curation component 300 will remove exemplary media files $M_5$, $M_6$, $M_7$, $M_8$ and $M_9$.

The content service provider may also set up deadlines for media content items to be removed from a given autonomous storage device 100. The deadlines are useful if the content service provider lets their clients rent a given content for a limited amount of time. This deadline information can be specified, for example, in the content description file. The data curation component 300 removes all the data from any content item that has achieved the specified deadline. FIG. 3 shows the table where the data curation component 300 stores the necessary information about the media content, such as the MFID 310, the last watched data 320 and the expiration deadline 330.

When the data curation component 300 removes media files from the non-volatile memory 130 of the autonomous storage device 100, the data curation component 300 also needs to remove the associations between the device UID and all the FID of media files in the hash table of the P2P network using the remove method, as noted above.

Conversely, if the autonomous storage device 100 has enough free space, other content items that are not requested by the user can also be downloaded in the autonomous storage device 100 with lower priority. For instance, it is possible to pre-download content items (or trailers of the content items) that the user is likely to watch, as predicted, for example, by an analytical tool from the content service provider.

Policy 2: Content Server-Side Support

The two remaining policies are designed to make a group of devices in the network to work together, as opposed to the above-described client-side implementation. All the devices installed in the same sub-network will self-organize themselves towards a specific goal. When the disclosed storage devices are installed on the content service provider infrastructure, they are configured with the server policy, which aims at substantially maximizing the content availability. Thus, each device will query a local counter to discover what content it needs to replicate and store inside the disk.

Figure 4:
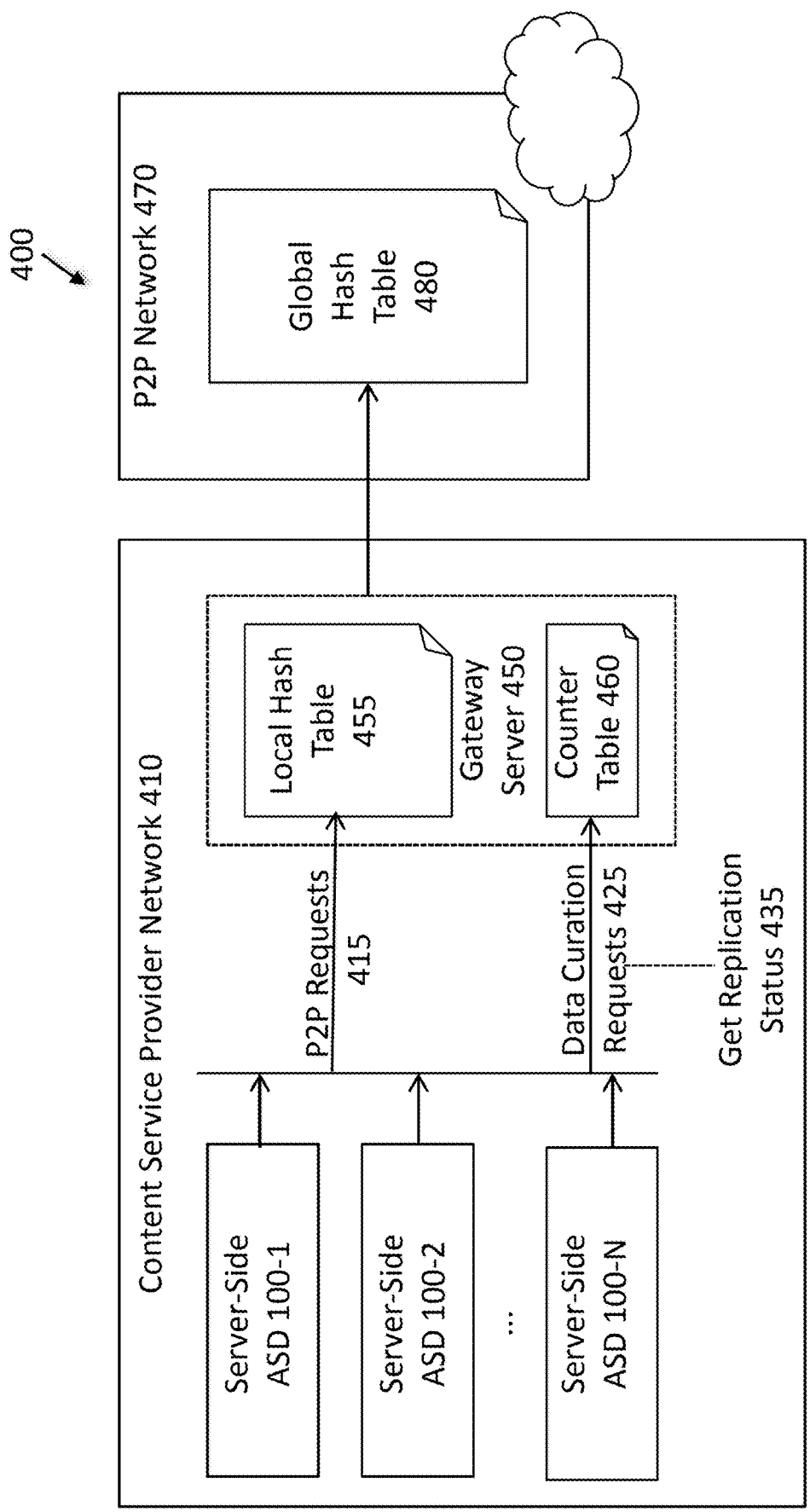
FIG. 4 illustrates a content service provider architecture that employs a plurality of the autonomous storage devices of FIG. 1, according to one embodiment of the invention.

FIG. 4 illustrates a content service provider architecture 400 that employs a plurality of the autonomous storage devices 100 of FIG. 1, according to one embodiment of the invention. As shown in FIG. 4, a plurality of autonomous storage devices 100-1 through 100-N are interconnected in a local network 410 of the content service provider and communicate with a peer-to-peer network 470 composed of one or more autonomous storage devices 100 in an external wide area network that consume or replicate the content. In one or more embodiments, the content service provider maintains a local hash table 455 identifying which autonomous storage devices 100 in the content service provider local network 410 store which fragments (e.g., (UID, FID) pairs) and a local counter table 460 indicating how many times each fragment is replicated in the content service provider local network.

When a given autonomous storage device 100 makes a peer-to-peer request 415 inside the content service provider local network 410, the peer-to-peer request 415 is sent to the local hash table 455. A gateway server 450 redirects the local peer-to-peer requests 415 to the external peer-to-peer network 470 to update a global hash table 480. The gateway server 450 also keeps the counter table 460 updated. The counter table 460 identifies how many times a media content with a given MFID is replicated in the local content service provider network 410. When a new autonomous storage device 100 is connected in the local network 410 of the content service provider, the new autonomous storage device 100 queries the counter table 460 to identify the content item(s) with the lowest count number(s).

The data curation component 300 of each autonomous storage device 100 is responsible to query the counter table 460 using data curation requests 425 to get a replication status 435. The data curation requests 425 search the content items that are less available in the content service provider network 410 and start the download. If the content service provider network 410 has available storage capacity, a given autonomous storage device 100 can arbitrarily decide what to store and will inform the local hash table 455. Periodically, the data curation component 300 of a given autonomous storage device 100 queries the counter table 460 to see if there is any content that is over-replicated or under-replicated according to current service provider policies. If so, the data curation component 300 can remove data from the non-volatile memory 130 to make space for new data requiring more replication.

In one or more embodiments, the content service provider can also implement a weighted prioritization, in order to replicate content based on a number of historical requests. The prioritization weights are configured in the gateway server 450 and affect the count numbers inside the counter table 460. In this manner, the content service provider can implement an autonomous and dedicated distributed system 400 that is capable of supporting a large download demand.

FIG. 4 illustrates an exemplary centralized P2P architecture 400, with a gateway server 450 serving as the main manager of the local hash table 455 and counter table 460. In one variation, however, the local hash table 455 and the counter table 460 can be implemented as distributed hash tables inside the content service provider network, as would be apparent to a person with ordinary skill in the art. In yet another variation, a gossip protocol can be used to update the count numbers inside the network without the use of a gateway server.

Policy 3: Cache Policy

When the disclosed autonomous storage devices are installed on an ISP infrastructure, the autonomous storage devices need to work together to serve as a distributed cache. Thus, the autonomous storage devices need to be setup using a cache policy. Content that is frequently requested by clients of the ISP are natural candidates to be cached on the ISP infrastructure.

Figure 5:
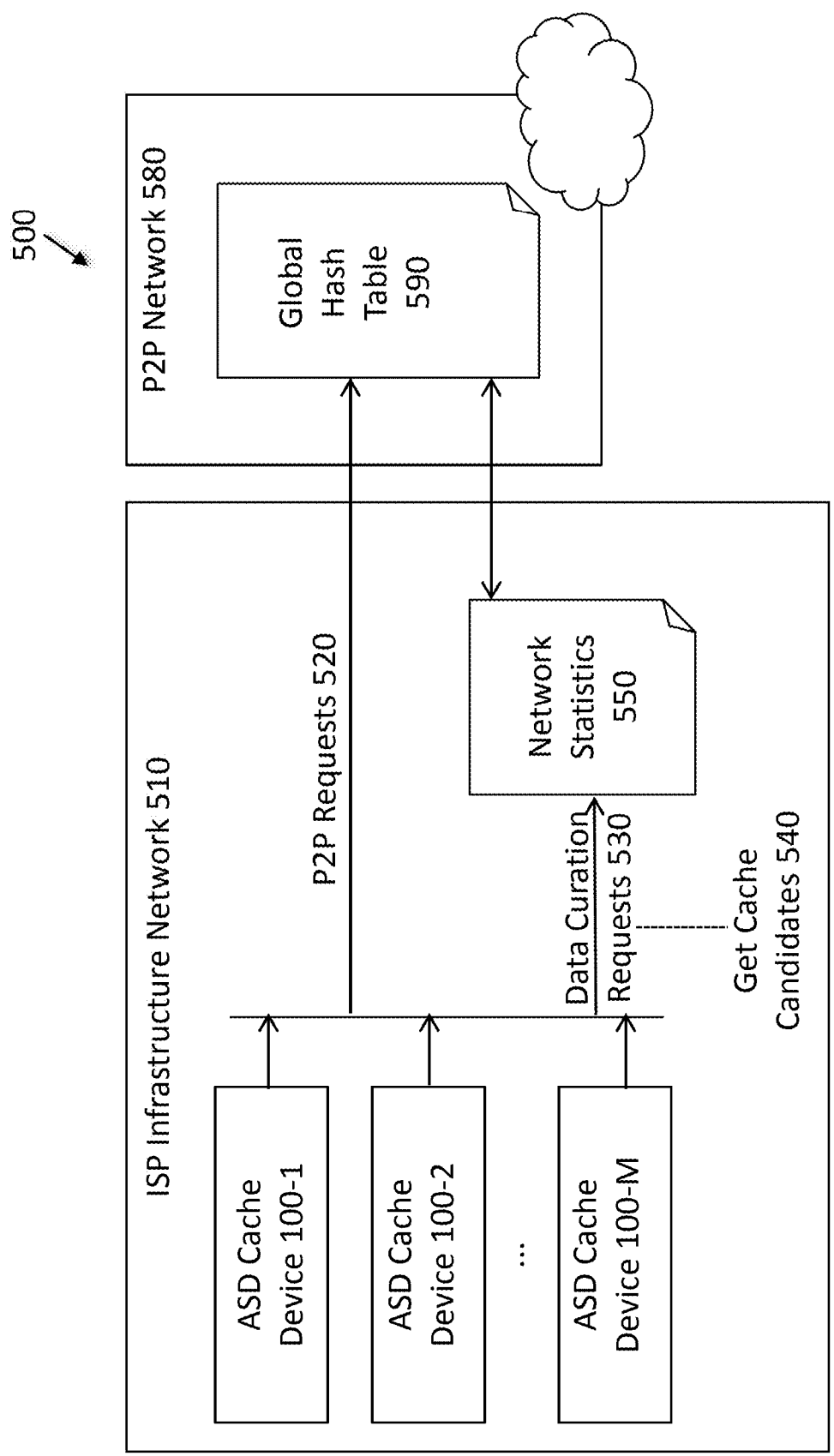
FIG. 5 illustrates an Internet service provider architecture that employs a plurality of the autonomous storage devices of FIG. 1, according to one embodiment of the invention.

FIG. 5 illustrates an Internet service provider architecture 500 that employs a plurality of the autonomous storage devices 100 of FIG. 1, according to one embodiment of the invention. As shown in FIG. 5, a plurality of autonomous storage devices 100-1 through 100-M are interconnected in a local network 510 of the ISP infrastructure and communicate with a peer-to-peer network 580 composed of one or more autonomous storage devices 100 in an external wide area network that consume or replicate the content. When a given autonomous storage device 100 makes a peer-to-peer request 520 inside the ISP infrastructure local network 510, the peer-to-peer request 520 is directed to an external peer-to-peer network 580 to update a global hash table 590.

Generally, the autonomous storage devices 100 are implemented as cache devices that interact with the peer-to-peer network 580 in a similar manner as the client-side autonomous storage devices described above in conjunction with FIG. 1 and the client-side policy. In addition, the cache-based autonomous storage devices 100 determine what content should be downloaded and stored in their respective non-volatile memories 130.

When a new cache-based autonomous storage device 100 is added to the local ISP infrastructure network 510, the data curation component 300 of the new autonomous storage device 100 will search a table 550 for network statistics using data curation requests 530 to get replication candidates 540 for the cache. In various embodiments, the network statistics information can be centralized on a server (such as a tracker), can be distributed in the network or can even be obtained by means of a gossip protocol. The statistics should contain, for each FID, the count of users that downloaded the fragment (or requested the download) in a predefined last time window. The size of the time window can vary depending on network traffic. Based on a ratio between the popularity of one or more fragments and their current presence in the network, the data curation component 300 will decide whether to cache a given content item.

In one possible implementation of the invention, the popularity of a fragment in a given time window is measured by:

$$P(FID) = FID \text{ Downloads/Total Downloads}$$

The presence of a given file identification number (FID) in the network is measured, as follows:

$$R(FID) = \text{Number of replicas of } FID/\text{Total number of replicas in the network}$$

Thus, the cache ranking can be calculated as follows:

$$CacheRank(FID) = P(FID) \times (1 - R(FID))$$

The data curation component 300 will decide to download the fragment with the greatest rank in order to increase its presence in the network.

Consequently, when a user requests the content, it will be able to download parts of the file from the content service provider, from the ISP and from other users.

EXAMPLE

A video streaming service is preparing a premiere of a new blockbuster series. The video streaming service estimates that eight million people will watch the series in the first fifteen days. This averages to approximately 500,000 views per day, which is more than 20,000 views per hour. If each episode of the series has an average file size of 85 GB (approximately 50 minutes of 4K video content) and if an underestimate assumes that each user will see only one episode per day, the total of data that the content service provider needs to broadcast per hour is almost 2 PB. It is important to notice that this is just for the premiering content, because the content service provider still needs to stream other videos from its catalog. This massive amount of data will also flow by the ISP network until it gets to the home screen of the user.

Alternatively, the content service provider, the ISP and clients can use the disclosed storage device to save data transmissions from server to clients. After the first hour of the premiere, thousands of users will have the content downloaded to their local devices 100. Thus, these users will be able to serve the content to other users. Furthermore, the ISP will also have cached the content and will be able to serve it faster and without new connections to the content service provider.

Conclusion

The demand for media content such as music and video from Internet streaming services is growing quickly. Service providers and Internet providers have difficulties to supply the massive amount of users with high quality media content at real time. Even with better bandwidth, the number of active screens inside each house grows. Consequently, the number of users increases and, with higher resolution screens, their quality requirements also increase. Thus, an efficient approach to distribute video content is still an open challenge.

One or more embodiments of the present invention provides an autonomous storage device 100 designed to support streaming and other content services. The disclosed autonomous storage device contains a non-volatile memory 130 and a single-board computer 110. A kernel 120 runs on top of the autonomous storage device with a P2P client 135 and a data curation component 300 that stores and indexes data in memory. In at least one embodiment, the autonomous storage device leverages Dell EMC storage and unikernel technologies and is designed to be installed in routers, smart televisions, set-top boxes and as storage arrays in datacenters from content service providers and Internet service providers.

In one or more embodiments, the disclosed autonomous storage devices 100 are designed to balance network traffic by enabling streaming data to be distributed by a peer-to-peer protocol. Instead of relying only on the data on the server side, the client can download fragments of the content stored in other clients in the neighborhood using the peer-to-peer network and cached in the storage devices of their ISP.

In at least one embodiment, the disclosed autonomous storage devices 100 comprise a single-board computer (SBC) 110. Thus, a peer-to-peer client can run on top of the autonomous storage device 100 to control data traffic and index content. Since the disclosed exemplary storage device 100 preserves disk native connections, the operating system of the server where the device is installed, or the operating system of the smart television or set-top box, can read the data separately from the SBC 110.

In at least one embodiment, the kernel 120 running on top of the single-board computer 110 implements a data curation component 300 to determine what content to keep in the storage device 100 and what content is a candidate to be replaced by fresher data. The kernel software can optionally be virtualized, for instance in a Docker container, if the physical device cannot be used.

The foregoing applications and associated embodiments should be considered as illustrative only, and numerous other embodiments can be configured using the techniques disclosed herein, in a wide variety of different applications.

It should also be understood that the disclosed autonomous storage devices and techniques for content distribution, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed autonomous storage device and techniques for content distribution may be implemented using one or more processing platforms. One or more of the processing modules or other components may therefore each run on a computer, storage device or other processing platform element. A given such element may be viewed as an example of what is more generally referred to herein as a "processing device."

Figure 6:
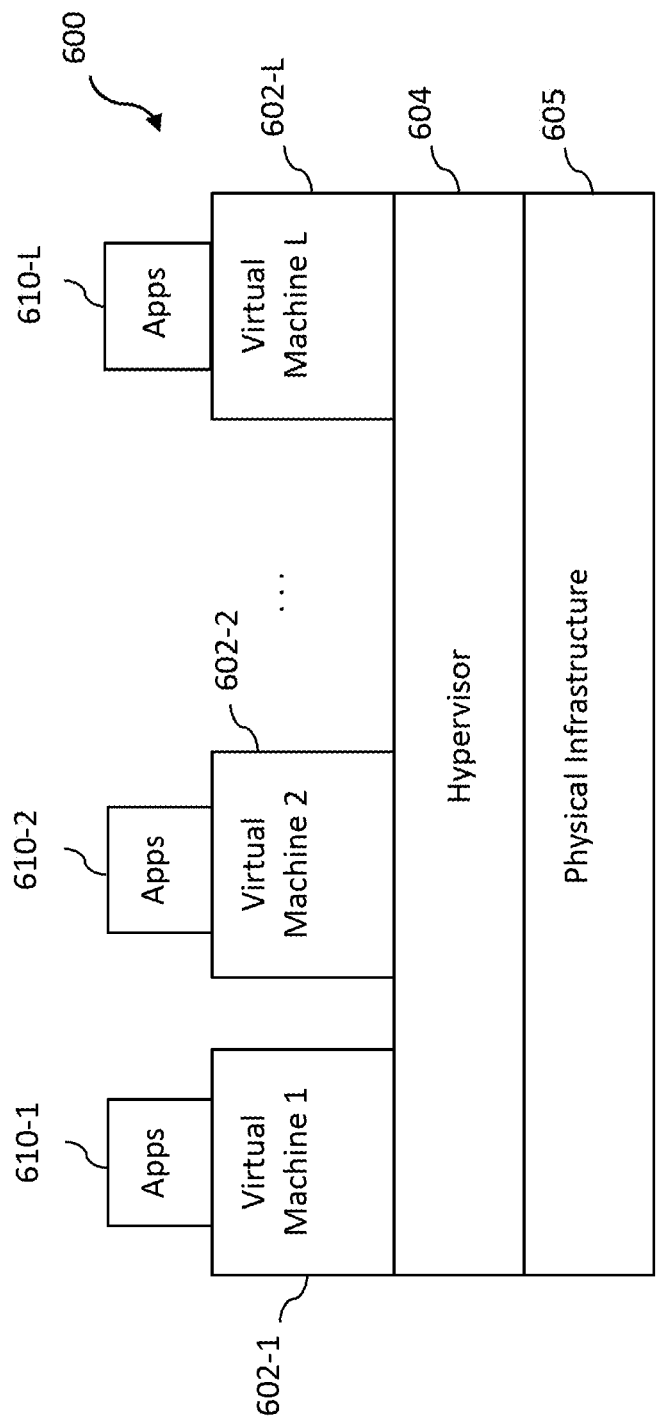
FIG. 6 illustrates an exemplary processing platform that may be used to implement at least a portion of one or more embodiments of the invention comprising a cloud infrastructure.

Referring now to FIG. 6, one possible processing platform that may be used to implement at least a portion of one or more embodiments of the invention comprises cloud infrastructure 600. The cloud infrastructure 600 in this exemplary processing platform comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

The cloud infrastructure 600 may encompass the entire given system or only portions of that given system, such as one or more of client, servers, controllers, or computing devices in the system.

Although only a single hypervisor 604 is shown in the embodiment of FIG. 6, the system may of course include multiple hypervisors each providing a set of virtual machines using at least one underlying physical machine.

An example of a commercially available hypervisor platform that may be used to implement hypervisor 604 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from Dell EMC of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 7:
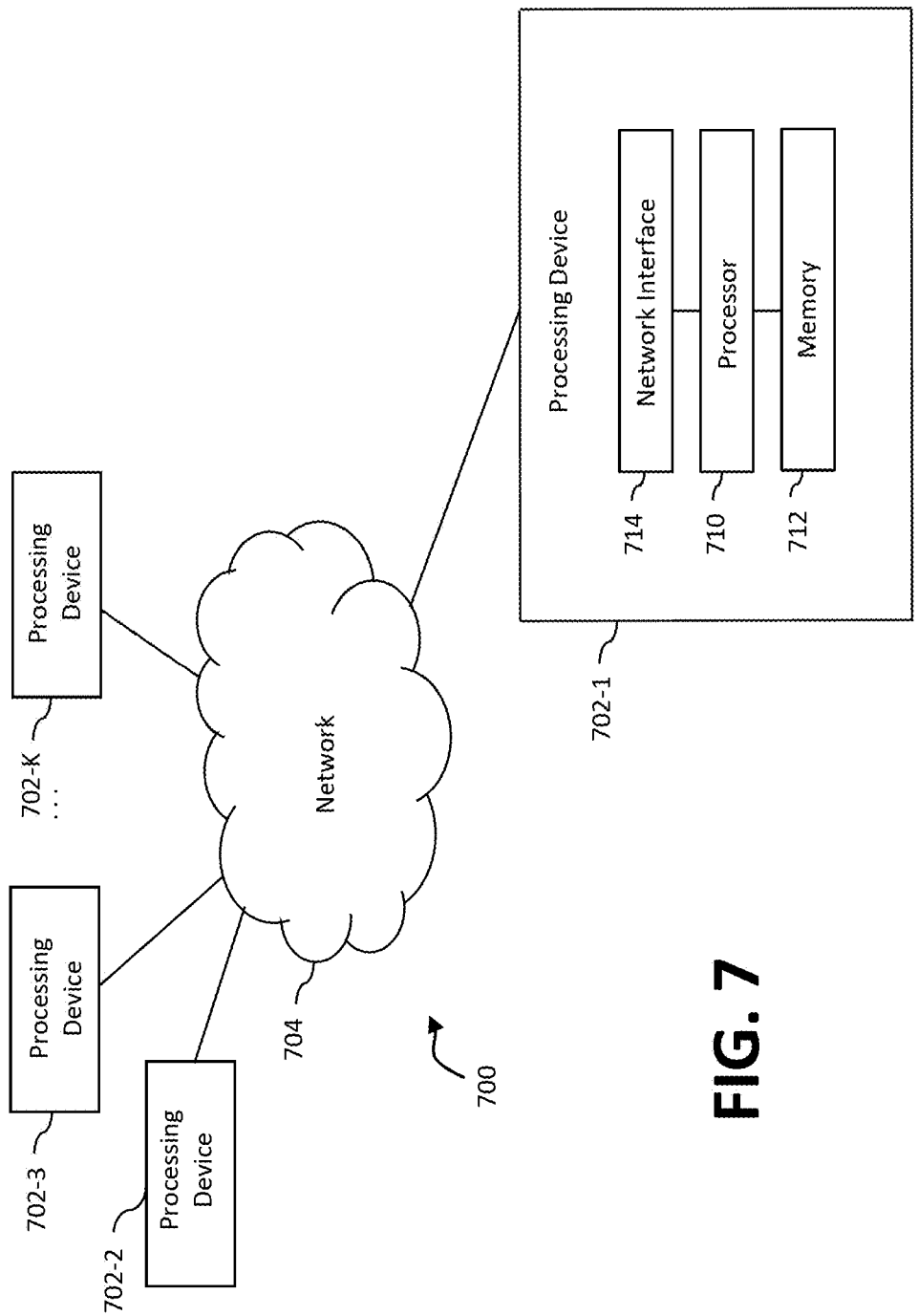
FIG. 7 illustrates another exemplary processing platform that may be used to implement at least a portion of one or more embodiments of the invention.

Another example of a processing platform is processing platform 700 shown in FIG. 7. The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "computer program product" having executable computer program code embodied therein, may comprise random access memory (RAM), read only memory (ROM) or other types of memory, in any combination.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed autonomous storage device and related techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A first storage device, comprising:
   a network interface for receiving requested content over a network;
   a non-volatile memory for storing said content;
   a read-only data interface that allows said requested content to be accessed by an external application; and
   a single-board computer connected to the non-volatile memory and having an operating system with an installed peer-to-peer file sharing client and an installed data curation component, wherein said peer-to-peer file sharing client is configured to receive and read said requested content selectively obtained from one or more of at least one peer of a streaming service provider, at least one peer of an Internet service provider and at least one peer of a client device over the network interface, and wherein said data curation component is configured to store and manage data in said non-volatile memory,
   wherein said first storage device interacts with a content cache of an Internet service provider, wherein said content cache comprises:
   a plurality of cache storage devices connected in a local network, wherein each of said plurality of cache storage devices comprise a single-board computer connected to a corresponding non-volatile memory, wherein each of said single-board computers have an operating system with an installed peer-to-peer file sharing client and an installed data curation component, wherein said peer-to-peer file sharing clients are configured to store requested content selectively obtained from one or more of at least one peer of a content service provider, at least one peer of an Internet service provider and at least one peer of a client device over a network interface, and wherein said data curation components are configured to store and manage data in said non-volatile memory; and
   at least one memory for storing network statistics indicating, for a given content item, a number of users that requested a download of the given content item in a predefined time window, wherein said data curation component of each of said plurality of said cache storage devices queries the network statistics to identify content fragments to cache based on a popularity of a given one of said content fragments and a corresponding availability of said given content fragment, wherein the corresponding availability of said given content fragment indicates a number of times given content fragment is replicated in the local network.

2. The first storage device of claim 1, wherein said data curation component is further configured to update an index of said requested content and maintain said requested content in said non-volatile memory based on a predefined retention policy.

3. The first storage device of claim 2, wherein said predefined retention policy retains said requested content in said non-volatile memory based on one or more of a last watched timestamp, a content rating, and an expiration deadline specified by a provider of said requested content.

4. The first storage device of claim 2, wherein a distinct predefined retention policy is provided for each of a client-side implementation; a content service provider implementation; and an Internet service provider implementation.

5. The first storage device of claim 1, wherein said hash table is updated by one or more of a put method that informs that a given storage device with a given device identifier has a file fragment with a given fragment identifier; a get method that obtains the given device identifier of one or more storage devices that contain a specified file fragment; and a remove method that informs that a given storage device with a given device identifier no longer has the fragment identified by the given fragment identifier.

6. The first storage device of claim 1, wherein said single-board computer is configured to negotiate with one or more peers to transfer fragments of the requested content, and to store the fragments in the non-volatile memory.

7. The first storage device of claim 1, further comprising a lightweight unikernel comprising a specialized machine image of said operating system to support said installed peer-to-peer file sharing client and said installed data curation component.

8. The first storage device of claim 7, wherein said lightweight unikernel has a minimal set of libraries and functionalities of said operating system necessary to support said installed peer-to-peer file sharing client and said installed data curation component.

9. A content distribution system of a content service provider, comprising:
   a plurality of content storage devices connected in a local network, wherein each of said plurality of content storage devices comprise a single-board computer connected to a corresponding non-volatile memory, wherein each of said single-board computers have an operating system with an installed peer-to-peer file sharing client and an installed data curation component, wherein said peer-to-peer file sharing clients are configured to receive and read requested content selectively obtained from one or more of at least one peer of a content service provider, at least one peer of an Internet service provider and at least one peer of a client device over a network interface, and wherein said data curation components are configured to store and manage data in said non-volatile memory; and
   a gateway server that stores a local hash table identifying file fragments stored by each of said content storage devices in the local network and a counter indicating a number of times each content item is replicated in the local network, and that updates a global hash table identifying file fragments stored in a peer-to-peer network including said local network, wherein said data curation component of each of said plurality of said content storage devices in the local network queries the counter to search for content items to download based on one or more of an availability of said content items in the local network, and a historical request frequency of the content items and an availability of storage resources in the respective content storage device,
   wherein one or more of said plurality of content storage devices interact with a content cache of an Internet service provider, wherein said content cache comprises:
   a plurality of cache storage devices connected in a local network, wherein each of said plurality of cache storage devices comprise a single-board computer connected to a corresponding non-volatile memory, wherein each of said single-board computers have an operating system with an installed peer-to-peer file sharing client and an installed data curation component, wherein said peer-to-peer file sharing clients are configured to store requested content selectively obtained from one or more of at least one peer of a content service provider, at least one peer of an Internet service provider and at least one peer of a client device over a network interface, and wherein said data curation components are configured to store and manage data in said non-volatile memory; and at least one memory for storing network statistics indicating, for a given content item, a number of users that requested a download of the given content item in a predefined time window, wherein said data curation component of each of said plurality of said cache storage devices queries the network statistics to identify content fragments to cache based on a popularity of a given one of said content fragments and a corresponding availability of said given content fragment, wherein the corresponding availability of said given content fragment indicates a number of times given content fragment is replicated in the local network.

10. The content distribution system of claim 9, wherein a request from a given one of said content storage devices in the local network is processed by accessing said local hash table.

11. The content distribution system of claim 9, wherein said counter is updated using a gossip protocol.

12. The content distribution system of claim 9, wherein each of said single-board computers is configured to negotiate with one or more peers to transfer fragments of the requested content, and to store the fragments in the corresponding non-volatile memory.

13. The content distribution system of claim 9, further comprising a lightweight unikernel comprising a specialized machine image of said operating system to support said installed peer-to-peer file sharing client and said installed data curation component.

14. A content cache of an Internet service provider, comprising:

a plurality of cache storage devices connected in a local network, wherein each of said plurality of cache storage devices comprise a single-board computer connected to a corresponding non-volatile memory, wherein each of said single-board computers have an operating system with an installed peer-to-peer file sharing client and an installed data curation component, wherein said peer-to-peer file sharing clients are configured to store requested content selectively obtained from one or more of at least one peer of a content service provider, at least one peer of an Internet service provider and at least one peer of a client device over a network interface, and wherein said data curation components are configured to store and manage data in said non-volatile memory; and at least one memory for storing network statistics indicating, for a given content item, a number of users that requested a download of the given content item in a predefined time window, wherein said data curation component of each of said plurality of said cache storage devices queries the network statistics to identify content fragments to cache based on a popularity of a given one of said content fragments and a corresponding availability of said given content fragment in the local network, wherein the corresponding availability of said given content fragment indicates a number of times given content fragment is replicated in the local network.

15. The content cache of claim 14, wherein each of said single-board computers is configured to negotiate with one or more peers to transfer fragments of the requested content, and to store the fragments in the corresponding non-volatile memory.

16. The content cache of claim 14, further comprising a lightweight unikernel comprising a specialized machine image of said operating system to support said installed peer-to-peer file sharing client and said installed data curation component.

17. The content cache of claim 16, wherein said lightweight unikernel has a substantially minimal set of libraries and functionalities of said operating system to support said installed peer-to-peer file sharing client and said installed data curation component.

18. The content distribution system of claim 9, wherein said data curation component is further configured to update an index of said requested content and maintain said requested content in said non-volatile memory based on a predefined retention policy.

19. The content cache of claim 14, wherein said data curation component of each of said plurality of said cache storage devices downloads one or more content fragments based on a ranking of the popularity of the content fragments and the availability of the content fragments.

20. The content distribution system of claim 9, wherein a given content storage device queries the counter to identify and download one or more file fragments with a substantially lowest replication count numbers in the content distribution system.

21. The content distribution system of claim 9, wherein the content service provider implements a weighted prioritization to replicate content based on the number of historical user requests.

* * * * *

UNITED STATES PATENT AND TRADEMARK OFFICE
CERTIFICATE OF CORRECTION

PATENT NO. : 10,749,980 B1  
APPLICATION NO. : 15/386158  
DATED : August 18, 2020  
INVENTOR(S) : Jonas F. Dias Page 1 of 1

It is certified that error appears in the above-identified patent and that said Letters Patent is hereby corrected as shown below:

In the Claims

Column 13, Lines 52-53, Claim 1, replace "indicates a number of times given content fragment is replicated in the local network." with -- indicates a number of times the given content fragment is replicated in the local network. --

Column 15, Lines 17-18, Claim 9, replace "indicates a number of times given content fragment is replicated in the local network." with -- indicates a number of times the given content fragment is replicated in the local network. --

Column 16, Lines 11-13, Claim 14, replace "indicates a number of times given content fragment is replicated in the local network." with -- indicates a number of times the given content fragment is replicated in the local network. --

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*